UNITED STATES PATENT OFFICE.

CHARLES TENNANT LEE, OF BOSTON, MASSACHUSETTS.

COMPOSITION OF MATTER.

SPECIFICATION forming part of Letters Patent No. 389,519, dated September 11, 1888.

Application filed November 30, 1887. Serial No. 256,508. (No specimens.)

*To all whom it may concern:*

Be it known that I, CHARLES TENNANT LEE, of Boston, county of Suffolk, and State of Massachusetts, have invented a certain new and useful Improvement in Composition of Matter, of which the following is a specification.

The object of my invention is the production of a material which shall be strong and hard, which may be easily molded to any shape when desired, and which may be cheaply produced; and it consists in a composition composed of mica or similar laminated substance, in a comminuted state, bound together with a resinous gum.

In the form in which I prefer my composition it consists of mica comminuted so as to form scales or laminæ, varying in size from very small fragments to pieces one-eighth or one-quarter of an inch, or even larger, mixed with shellac in the proportion of about sixty-five parts of mica, by weight, to thirty-five parts of shellac. These proportions may of course be varied; but I prefer the proportions given for the best results. The mica is incorporated with the shellac by the aid of heat, which softens the shellac, after which any suitable method of mixing the substances may be employed. I prefer to mix them by means of a friction-roll mixer, of well known construction, consisting of a pair of heated rolls, one roll running at about one-third greater speed than the other roll. The pieces of shellac and mica are mixed and thrown together onto the hot rolls, which revolve side by side and may be adjusted relatively to each other, and as the mixture passes through into a trough or receiver placed underneath it is again put onto the rolls, and this working is continued until it becomes a plastic mass, when it will adhere to one of the rolls, whence it is skived off with the aid of a knife and laid aside in a flat sheet. To prepare these sheets for molding, in case they are allowed to cool, I prefer to place them on a steam-table, and thus heat them until they become plastic and workable again, after which the sheets, or parts of them, of a proper size, are put into hot molds, molded under pressure, and allowed to cool. Such a composition will take a clear and fine impression in the molds, is comparatively light, very strong and durable, and may be used for a great variety of purposes. In mixing the mica and shellac to form a sheet of composition, the laminæ of mica tend to a parallel position, and as they overlap and interlock the breaking strength of the composition is very much greater than that of compositions in which laminated material is not used. In case the composition is to be molded, it will be found very desirable to use either shellac alone or a considerable quantity of shellac combined with other resinous gum.

I am aware of Letters Patent No. 137,509, granted to William A. Torrey, under date of April 1, 1873, which describes a vulcanized compound which contains shellac and mica, and I disclaim all such vulcanized compounds.

The chief use of my compound is its application to metal handles or other objects to render them non-conductive.

What I claim is—

The composition of matter herein set forth, consisting of a laminated substance, such as mica, in a comminuted state, mixed and incorporated with a resinous gum, such as shellac, by the aid of heat.

CHAS. TENNANT LEE.

Witnesses:
WM. A. MACLEOD,
ROBERT WALLACE.